(12) United States Patent
Smires et al.

(10) Patent No.: US 8,379,571 B2
(45) Date of Patent: Feb. 19, 2013

(54) METHOD AND APPARATUS FOR PROVISIONING DUAL MODE WIRELESS CLIENT DEVICES IN A TELECOMMUNICATIONS SYSTEM

(75) Inventors: Daniel T. Smires, Freehold, NJ (US); John Riley, Topsfield, MA (US)

(73) Assignee: Vonage Network LLC, Holmdel, NJ (US)

( * ) Notice: Subject to any disclaimer, the term of this patent is extended or adjusted under 35 U.S.C. 154(b) by 1045 days.

(21) Appl. No.: 12/367,175

(22) Filed: Feb. 6, 2009

(65) Prior Publication Data

US 2009/0196285 A1 Aug. 6, 2009

Related U.S. Application Data

(60) Provisional application No. 61/063,880, filed on Feb. 6, 2008.

(51) Int. Cl.
*H04W 4/00* (2009.01)
(52) U.S. Cl. ........ 370/328; 370/401; 455/422.1
(58) Field of Classification Search .......... None
See application file for complete search history.

(56) References Cited

U.S. PATENT DOCUMENTS

| | | | |
|---|---|---|---|
| 7,515,042 B2 * | 4/2009 | Benco et al. | 340/539.11 |
| 7,848,769 B2 * | 12/2010 | Fuller et al. | 455/521 |
| 2007/0066293 A1 * | 3/2007 | Peng et al. | 455/418 |
| 2007/0094374 A1 | 4/2007 | Karia et al. | |
| 2009/0158148 A1 * | 6/2009 | Vellanki et al. | 715/700 |
| 2010/0023603 A1 * | 1/2010 | Archer et al. | 709/220 |

FOREIGN PATENT DOCUMENTS

| | | |
|---|---|---|
| JP | 2005244997 A | 9/2005 |
| KR | 1020070103978 A | 10/2007 |
| WO | 2005041612 A1 | 5/2005 |
| WO | 2006052563 A2 | 5/2006 |
| WO | 2007041663 A2 | 4/2007 |
| WO | 2007079579 A1 | 7/2007 |

OTHER PUBLICATIONS

International Search Report and Written Opinion mailed Sep. 22, 2009 for PCT Application No. PCT/US2009/033439.

* cited by examiner

*Primary Examiner* — Bob Phunkulh
(74) *Attorney, Agent, or Firm* — Moser Taboada; Joseph Pagnotta

(57) ABSTRACT

Method and apparatus for provisioning a wireless multi-modal client device in a telecommunications system includes determining a provisioning environment within and a provisioning condition under which the client device is operating, determining a state of a configuration file of the client device and obtaining an updated configuration file based on the provisioning environment and provisioning conditions. The provisioning environment is determined by detecting one or more wireless networks accessible by the client device such as an IP-based network and a PSTN-based network. Connection to the IP-based network is made via WiFi and to the PSTN-based network via GSM/GPRS. The wireless networks defining the provisioning environment have characteristic timing intervals for configuration file updating. There is also an incremental timer that determines the elapsed time for each characteristic timing interval and switches between characteristic timing intervals depending upon the provisioning environment that the client device is operating within.

18 Claims, 5 Drawing Sheets

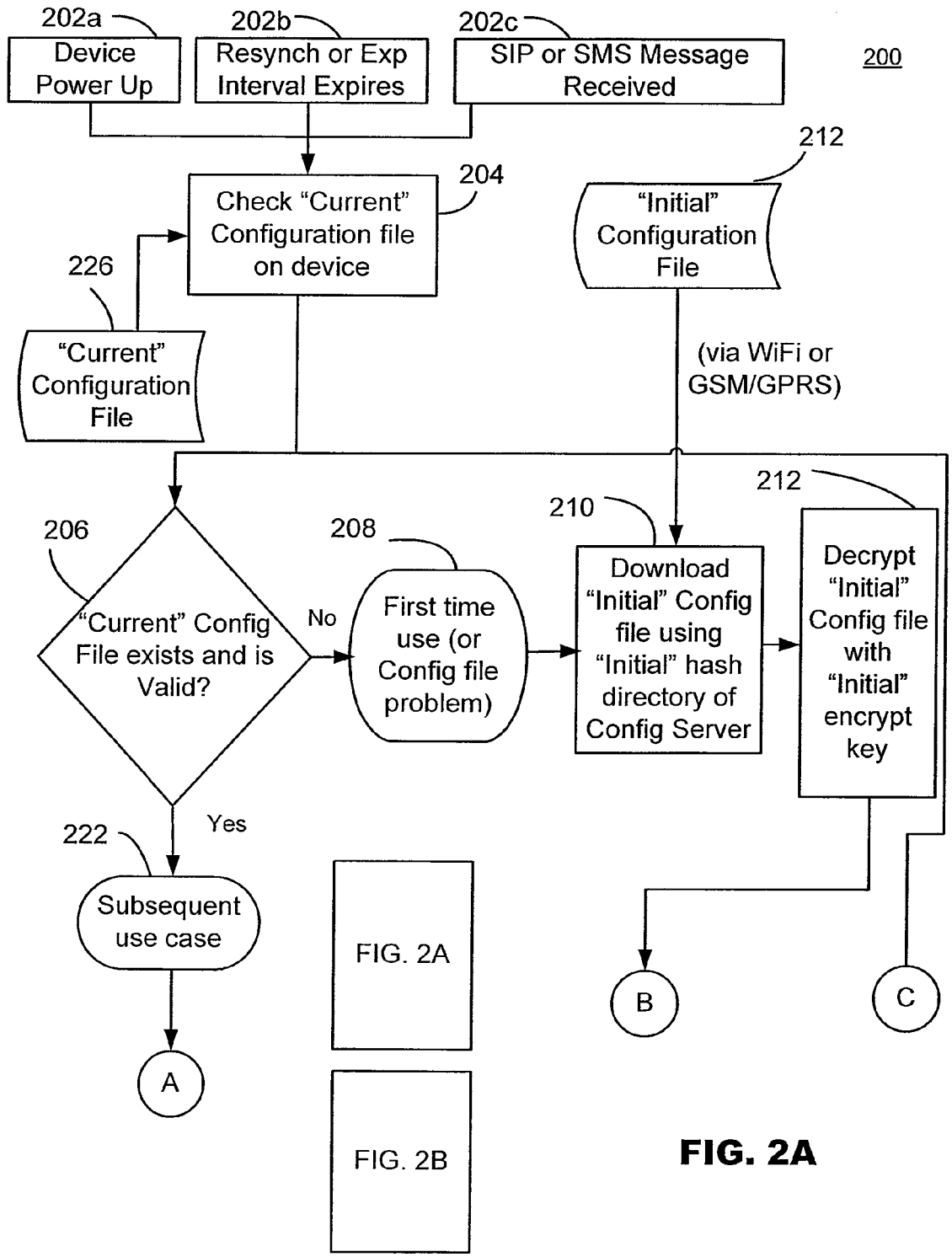

METHOD AND APPARATUS FOR PROVISIONING DUAL MODE WIRELESS CLIENT DEVICES IN A TELECOMMUNICATIONS SYSTEM

CROSS-REFERENCE TO RELATED APPLICATIONS

This application claims priority to U.S. Provisional Patent Application Ser. No. 61/063,880, filed Feb. 6, 2008, which is incorporated by reference herein in its entirety.

FIELD OF THE INVENTION

The invention is related to the field of telecommunication devices and services and more specifically, the invention is directed to a method and apparatus for provisioning a wireless client device regardless of the type of wireless environment or connection protocols available to the client device.

BACKGROUND OF THE INVENTION

Voice over IP (VoIP) is a technological development in the field of telecommunications that is utilized to establish and provide voice communications over a data network using the Internet Protocol (IP). Entities (e.g., businesses or individuals) implement VoIP by purchasing and installing the necessary equipment (e.g., one or more Customer Premise Equipment (CPE) devices) and service (i.e., a "high speed" network or broadband connection) to access a VoIP service provider and activating this telecommunication service. Since VoIP is a relatively new technology in terms of its commercial penetration, it has yet to completely supplant the existing and traditional telecommunications system more commonly referred to as the Public Switched Telephone Network (PSTN) or Plain Old Telephone Service (POTS). This is particularly notable in the wireless telecommunications space where cellular telephones, towers and satellites have augmented the "reach" of the PSTN beyond traditional land lines by operating according to wireless communications protocols such as Global System for Mobile communications (GSM) and the like. Accordingly, there is a huge amount of existing PSTN equipment that entities are reluctant to completely abandon for economic and strategic reasons. To further complicate matters, VoIP-based devices and existing PSTN-based devices are not compatible; thus, an entity desiring to exploit VoIP in a wireless environment would have to purchase additional equipment having the appropriate communications protocols such as IEEE 802.11 (also known as Wi-Fi).

To address this shortcoming, mobile telephones containing both cellular and non-cellular radios used for voice and data communication have been developed. Such dual mode phones use cellular radio which will contain GSM/CDMA/W-CDMA (normal and/or wideband code division multiple access) as well as other technology like (Wi-Fi) radio or DECT (Digital Enhanced Cordless Telecommunications) radio. These phones can be used as cellular phones when connected to a wide area cellular network and, when within range of a suitable WiFi or DECT network, these phones can be used as a WiFi/DECT phones for all communications purposes. This dual mode of operation capability can reduce cost (for both the network operator and the subscriber), improve indoor coverage and increase data access speeds. However, a VoIP-capable dual mode telephone must be provisioned using methods beyond the out-of-band methods used by the cellular network. A configuration file (part of the provisioning process) contains the necessary information to provision a VoIP-capable phone with the basic operational parameters to connect to a broadband network, register with the VoIP service provider and complete telephone calls as well as setting default attributes for various selectable functions and options. Since charges (either in the form of a pre-paid minute budget or actual monetary units per connection period) are incurred for accessing a GSM or similar network, it is not desirable to spend such time accessing the GSM network for the purpose of updating or otherwise maintaining a VoIP configuration file. Additionally, if an updated configuration file becomes available while the telephone is in a GSM environment (as opposed to a WiFi environment), signaling the telephone of the availability of such updated configuration file is not economical because there is no direct access to the VoIP service provider.

Therefore, there is a need in the art for a method and apparatus for optimizing both WiFi and GSM type networks in a dual mode telephone for the purposes of provisioning same so as to reduce the operational cost of the associated communications service and improve the user experience.

SUMMARY OF THE INVENTION

Embodiments of the invention relate to a method, apparatus, and computer readable medium providing for provisioning a wireless multi-modal client device in a telecommunications system. Provisioning occurs by determining a provisioning environment within and a provisioning condition under which the client device is operating, determining a state of a configuration file of the client device and obtaining an updated configuration file based on the provisioning environment and provisioning conditions. The provisioning environment is determined by detecting one or more wireless networks accessible by the client device such as an IP-based network and a PSTN-based network. In two embodiments, a connection to the IP-based network is made via WiFi and a connection to the PSTN-based network is made via GSM/GPRS.

Each of the wireless networks defining a given provisioning environment has a characteristic timing interval for configuration file updating. In two embodiments, the IP-based network environment has a resynchronization timing interval preferably in the range of approximately 1-86400 seconds and the PSTN-based network environment has an expiration timing interval preferably in the range of approximately 1-30 days. The invention also includes an incremental timer that determines the elapsed time for each characteristic timing interval and switches between characteristic timing intervals depending upon the provisioning environment that the client device is operating within.

When the client device is powered up, the updated configuration file is retrieved via the IP-based network as a first preference and the PSTN-based network as a second preference. Each of the wireless networks defining a given provisioning environment has a characteristic notification message for requesting an updated configuration file. In one embodiment, the IP-based network notification message is a SIP-based message and preferably a NOTIFY message. In an alternate embodiment, the PSTN-based network notification message is a Short Messaging Service (SMS).

The step of determining the state of the configuration file further includes determining whether the configuration file exists and is valid in the client device and is the latest configuration file available in the telecommunications system. If necessary, the obtaining of the updated configuration file further includes accessing the provisioning environment as a result of an operation selected from the group consisting of a push and a pull.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

A method and apparatus for provisioning wireless client devices in accordance with the subject invention is generally seen and described in the following disclosure. The method provides for determining where the wireless client device is (i.e., what network the device is connected to for the purposes of completing calls and conducting configuration file updates). From this determination and an analysis of the configuration file, the wireless client device can take the appropriate steps to perform communications operations such as but not limited to provisioning itself in the most cost-effective manner given its location and one or more internal device timers governing provisioning intervals herein referred to as "universal provisioning". Other possible operations include the ability to place a telephone call from a first type of network to another, heterogeneous or dissimilar network. Such ability would require only one type of device and one access mechanism (i.e., telephone number) to communicate over dissimilar networks. An apparatus for universal provisioning of wireless client devices similarly provides the necessary communication link between the wireless client device and the available network to perform configuration file updating in the desired manner.

Figure 1:
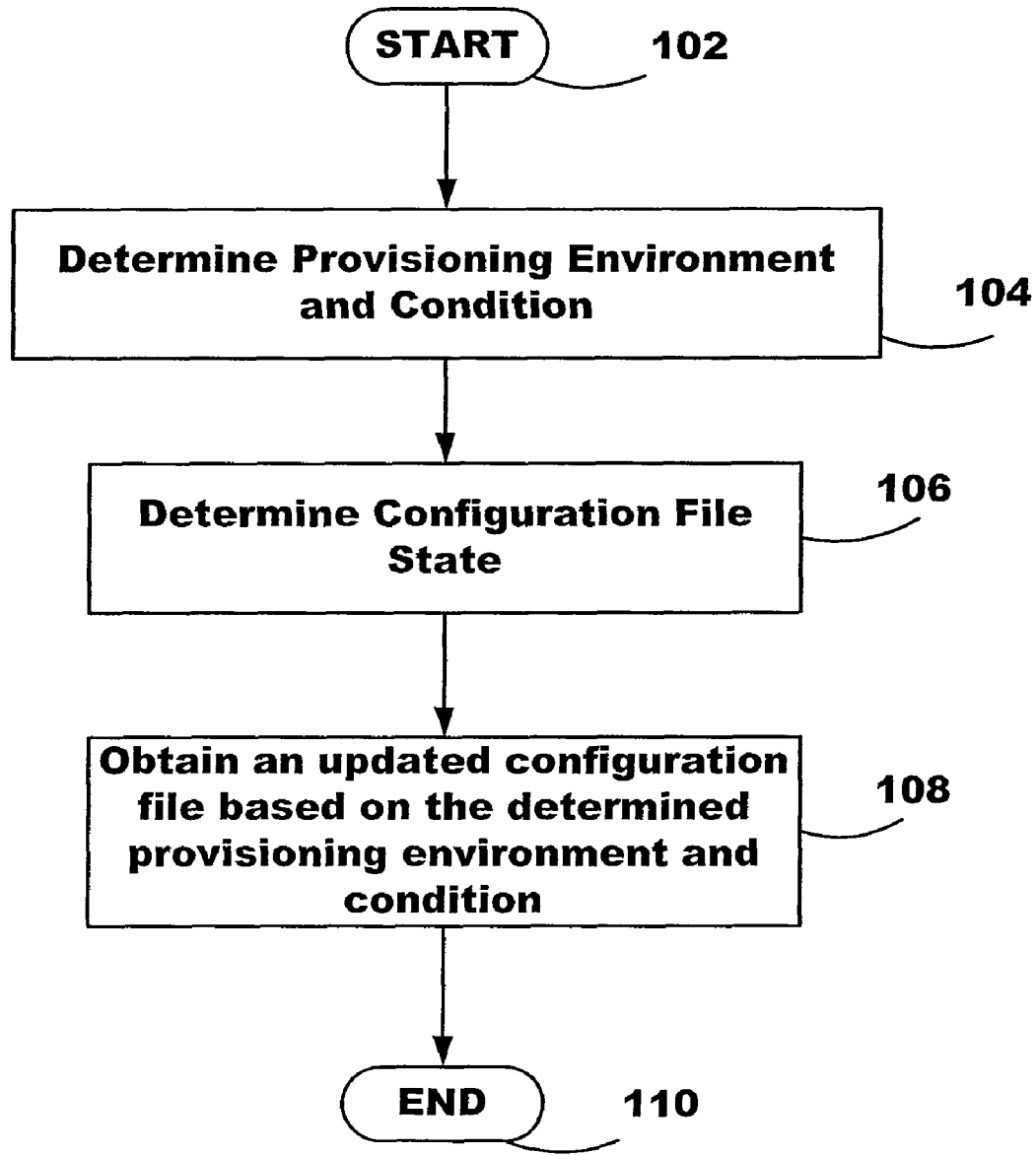
FIG. 1 depicts a series of method steps for provisioning a wireless client device in a telecommunications system in accordance with the subject invention.

A method 100 in accordance with the subject invention is seen in FIG. 1 which depicts a flowchart having a series of steps for improved provisioning of wireless client devices. In detail, the method 100 starts at step 102 and proceeds to step 104 where a provisioning environment and provisioning condition is determined by the wireless client device. That is, the wireless client device intercepts one or more wireless signals broadcast from a remote location representing wireless network availability. Analysis of the wireless signal(s) by the client device provides identification of the type of network (or wireless environment) in which the wireless client device is operating. In one embodiment of the invention, such operating environment is one selected from the group consisting of a WiFi environment and a GSM/GPRS environment. Those skilled in the art of wireless telecommunications know that other types of environments exist and can be readily accessed with the appropriate types of hardware and signaling protocols and are considered within the scope of the invention. Determination of the provisioning condition is based on the state of the wireless client device or in other words the reason for the provisioning activity. In one embodiment of the invention, the reasons for the provisioning activity is selected from the group consisting of wireless client device power up, expiration of an internal device timer (a PULL action) and receipt of an "update waiting" message (a PUSH action). The provisioning activity occurs because a phone or other networked device cannot generally just "receive" a file download. Due to the inherent security conventions in IP networks, devices need to initiate the request, and then routers or firewalls (which generally lie between the device the server containing the file to be downloaded) will allow the file to pass through them. For example, unrequested downloads are seen as hacking activity and usually rejected.

At step 106, a step of determining a configuration file state is executed. Specifically, the wireless client device may or may not have a configuration file in its memory depending on various conditions. In one embodiment of the invention, these conditions are selected from the group consisting of whether the device ever been activated (i.e., first use?), when the device was last connected to the service provider's network vs. a third party network and other conditions known to those skilled in the art. Once this state is determined, the wireless client device "knows" whether it has the most current set of operating parameters and instructions available in order to perform the desired functions. In one embodiment of the invention, the determination is made by at least one (and not exclusively one) of the options selected from the group consisting of checking for an existing (current) and valid configuration file and checking for an updated configuration file to overwrite the current configuration file.

At step 108, a step of obtaining an updated configuration file based on the determined provisioning environment and configuration file condition is executed. Specifically, once the wireless client device is "aware" of the type of network it is connected to and whether it is necessary to obtain an updated configuration file, the wireless client device performs the update operation over the available network (and in accordance with predefined rules for accessing same, explained in greater detail below) to obtain the most up-to-date configuration file. This provides an advantage over existing devices that are not capable of performing universal provisioning (i.e., not being limited to a specific network connection or timeframe for obtaining the updated configuration file. The method 100 ends at step 110.

Figure 4:
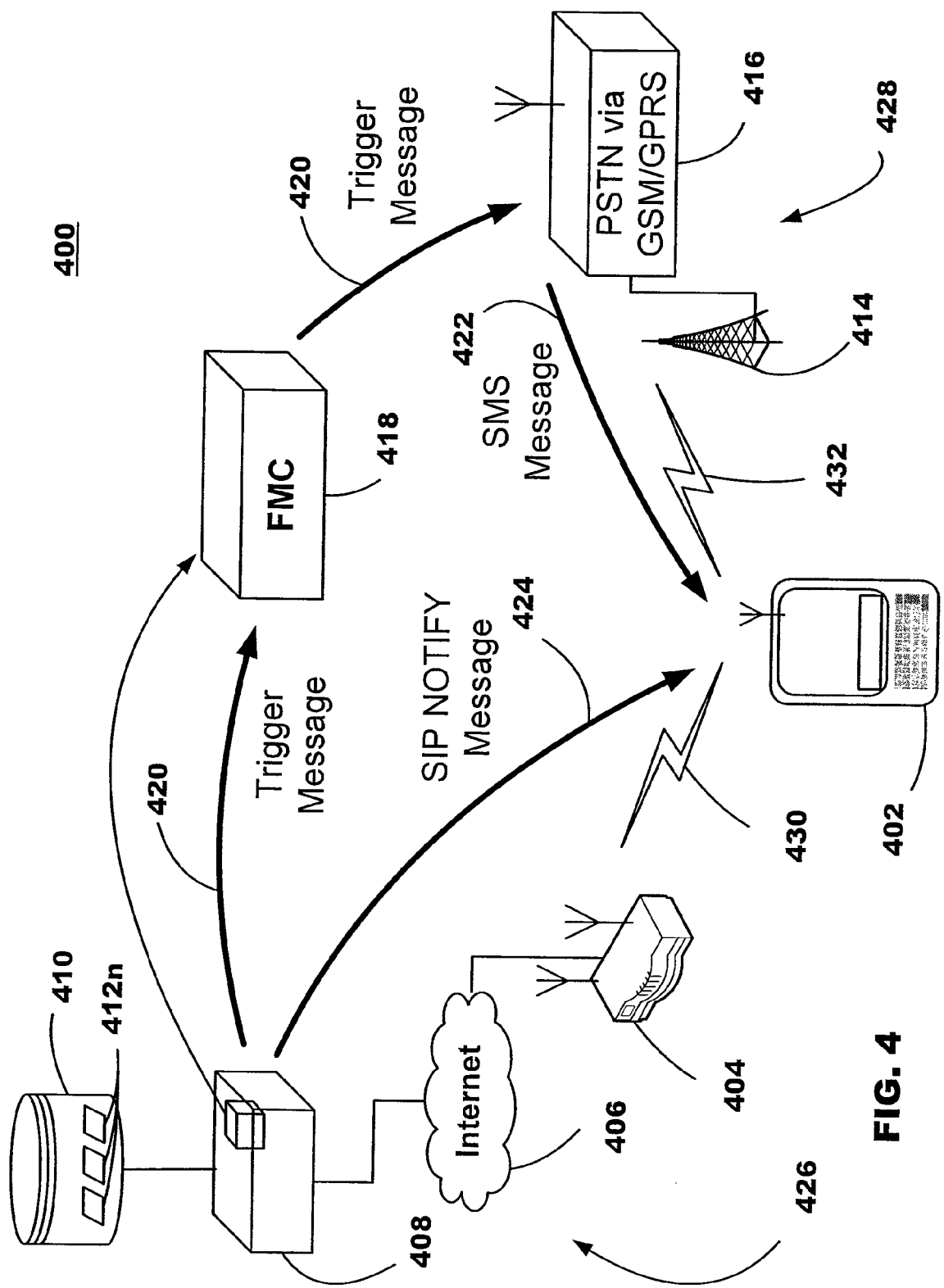
FIG. 4 depicts a representational diagram of a dual mode telecommunications system in accordance with the subject invention.

An apparatus in accordance with the subject invention is seen in FIG. 4 which depicts a representational diagram of a dual-mode telecommunication system (DMTS) 400. The DTMS 400 includes a dual mode wireless client device 402. This client device 402 is provided with the necessary combination of hardware and software to send and receive voice telephone calls via two completely different and incompatible networks and protocols. In one embodiment of the invention, the two networks are a packet-based network 426, such as but not limited to the Internet and related interconnecting components, using a VoIP protocol and a PSTN network 428 using circuit switching protocol.

The client device 402 is connected to the packet network 426 via a first environment 430 and to the PSTN network 428 via a second environment 432. In one embodiment of the invention, the first environment 430 is a wireless packet-based connection such as but not limited to WiFi and the second environment 432 is a wireless PSTN-based connection such as but not limited to GSM/GPRS (General Packet Radio Services aka IEEE 2.5G protocol). In one example, the packet network 426 includes a wireless router 404 which is capable of creating and establishing the first environment 430, a packet network infrastructure 406 (e.g., the Internet) which provides the physical pathways for packet transport and a VoIP provider 408 which provides the necessary equipment and programming to establish voice communications sessions between the client device 402 and a third party (not shown). In a preferred embodiment of the invention, the VoIP provider 408 is Vonage™ of Holmdel, N.J. In one example, the PSTN network 428 includes a cellular tower 414 which is capable of creating and establishing the second environment 432 and PSTN provider equipment (i.e., switches, etc.) 416 which provides the infrastructure for non-packet transport of voice communications sessions between the client device 402 and the third party.

The VoIP provider 408 also contains a configuration file database 410 which maintains one or more configuration files 412*n*. As discussed earlier, the configuration files 412*n* contain the basic information that allows the client device 402 to provision itself with basic operational parameters to connect to a broadband network, register with the VoIP service provider and complete telephone calls as well as setting default attributes for various selectable functions and options such as but not limited to executing telephone calls via a GSM/GPRS environment via (in part) the PSTN. These one or more files are updated based on a plurality of circumstances including but not limited to the following:

when the VoIP provider 408 enables service by authorizing the client device 402;

when the VoIP provider 408 has modified parameters related to the service;

when the customer or user of the service has modified user-configurable options or parameters related to the service;

when the VoIP provider 408 wishes to periodically re-authorize the client device 402 and when the VoIP provider 408 disables service by de-authorizing the client device 402.

When updated configuration files become available, it is important that they are passed on (i.e., downloaded) to the client device 402 soon after availability. In some situations, the configuration file must be immediately downloaded. Accordingly, it is important that there be a mechanism and method by which the configuration files are passed on to devices having access to the two heterogeneous networks described.

Given that the client device 402 is a dual mode device, there are two possible environments in which notification of the availability of the configuration file can be given (i.e., via the packet-based network 426 or the non-packet based network 428). Additionally, the subject invention establishes PUSH and PULL as two fundamental concepts for providing information to a given point on a network in general (and to wireless client devices 402 in this particular invention). Speaking from the perspective of the client device 402, the PULL concept provides the information to the client device 402 at the conclusion of a predetermined time interval. For the purposes of the subject invention, there is a characteristic PULL timing interval for each of the possible environments so as to optimize the use and costs associated with each environment. Specifically and in one embodiment of the invention, the packet-based environment 430 employs the PULL concept with a resynchronization timing interval and such interval is in the range of approximately 1800 seconds (30 minutes). The non-packet based environment 432 employs the PULL concept with an expiration timing interval and such interval is in the range of approximately 1-30 days and preferably 7 days. The differences in the resynchronization timing interval and the expiration timing interval allow the client device 402 to best make use of the lower cost packet-based environment when looking for updated configuration files. That is, the client device will poll the VoIP provider 408 much more often over the packet-based environment 430 than the non-packet based environment 432 so as to reduce the applicable minutes/data etc. types of charges that are typically associated with accessing a PSTN network 428 in such a non-packet based environment 432.

Speaking from the perspective of the client device 402, the PUSH concept provides the information to the client device 402 automatically and without regard to the specific time interval (i.e., PUSHed information is dispatched from the VoIP provider 408 to the client device 402 immediately upon the information's availability (or soon thereafter) for dispatchment. However, the system 400 must first know what environment (i.e., an IP-based environment via WiFi or a PSTN environment via GSM/GPRS) the wireless client device is in prior to performing the PUSH operation. Each of the wireless networks defining a given provisioning environment has a characteristic message for notifying the device of an updated configuration file. Specifically and in one embodiment of the invention, when the device is in an IP-based network, the notification message is a SIP-based message. One non-limiting example of such a SIP-based message is a NOTIFY message. Such message is always sent over the packet-based network 430 when it is available to the client device 402. Additionally, when the device is in a PSTN-based network and only such network is available, the notification message is a Short Messaging Service (SMS) message. Once the system 400 determines where the device 402 is (for example by performing at least step 104 of previously described method 100), the appropriate notification message is sent over the network that the device 402 is currently connected. For example, if the client device 402 can register to the VoIP service provider 408, an IP path is confirmed and it's known that the NOTIFY will get to the client device 402. SMS will always get there (eventually) whenever the client device 402 is accessible over non-packet-based network 432 into the cellular infrastructure. If there is a circumstance where the phone is not available over WiFi (this is known by register state) and provisioning is critical/necessary, an SMS message is sent to trigger the phone to download the update.

In one embodiment of the invention, notification message selection is performed by VoIP service provider equipment as described below. Specifically, a Fixed Mobile Converter module (FMC) 418 is part of the VoIP service provider equipment 408 and facilitates the messaging/signaling process. The specific purpose and function of the FMC 418 is to manage the infrastructure between the IP-based and PSTN-based networks and manage handoff control. Handoff is known in the art as the process for safely transitioning an ongoing telephone call from a first wireless environment to a second wireless environment. Although the term has certain existing conceptual understanding (i.e. performing the transitioning of a telephone call from a first wireless PSTN-style cell site with a first set of geographically defined limits to a second PSTN-style cell site with a second set of geographically defined limits), "handoff" for the purposes of the subject invention is further defined as transitioning telephone calls between two or more heterogeneous networks such as the IP-based and PSTN-based networks described above.

When the wireless client device 402 enters an IP-based network 426, a registration process (i.e, SIP-based registration) occurs which identifies the client device 402 as being active and ready to perform communications operations and the VoIP service provider 408 resultantly sets a Packet Network Registration Status (PNRS) Identifier 419. In one embodiment of the invention, the PNRS Identifier 419 is a SIP Registration flag set in the VoIP provider equipment 408 that is passed on to the FMC 418. While the client device 402 remains in the IP-based network 426 and environment 430, the FMC 418 generates a SIP-based message 424 (i.e., a NOTIFY message). The NOTIFY message 424 travels from the VoIP service provider 408, through the IP-based network 426 and environment 430 to the client device 402 to perform communications operations such as, but not limited to alerting the device 402 that there is an updated configuration file awaiting download to the device 402. When the device is in a PSTN-based network 428 and environment 432, the PNRS Identifier 419 status is set to acknowledge that the client device is no longer registered to an IP network. Accordingly, the FMC 418 generates a trigger message 420. The trigger message 420 travels from the VoIP service provider 408, to the PSTN equipment 416 using known network systems and protocols such as but not limited to GPS/GPRS. The trigger message 420 in turn generates an SMS Message 422. Such SMS Message 422 is then sent over the PSTN-based network 428 and environment 432 to the client device 402 to alert the device 402 of the status of communications operations such as, but not limited to the condition that there is an updated configuration file awaiting download to the device 402. Once the notification message is received (either via WiFi or GSM/GPRS), the device 402 sends a configuration file request over the accessible network it is connected to and obtains an updated configuration file via appropriate download protocols. In one embodiment of the invention, the download of the updated configuration file is performed via WiFi using a protocol that is commonly known in the art and selected from the group consisting of HyperText Transfer Protocol (HTTP) and Trivial File Transfer Protocol (TFTP) and preferably HTTP. In an alternate embodiment, the download of the updated configuration file is performed via GSM/GPRS using the same underlying HTT of TFT protocols as identified above.

Figure 2B:
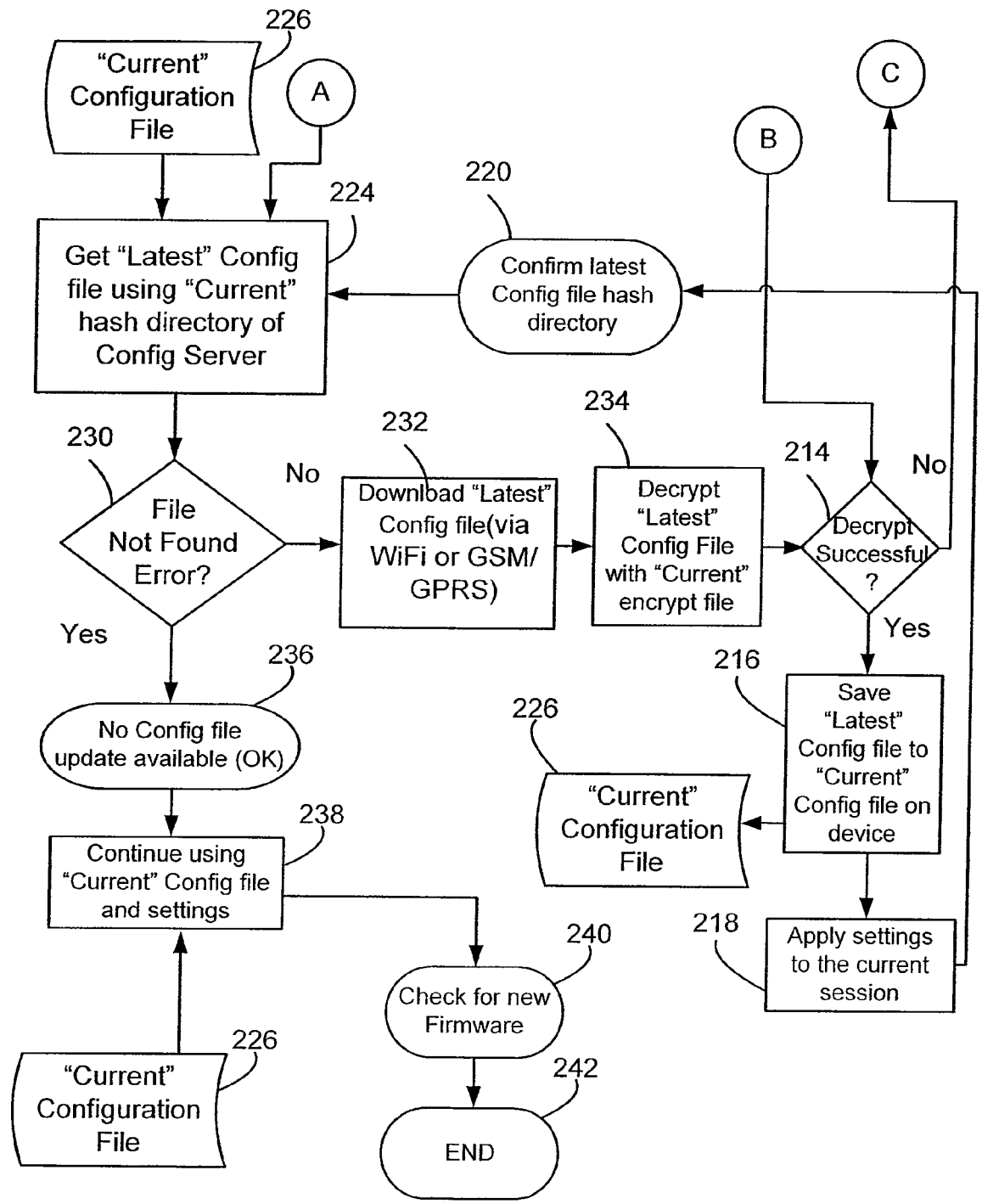
FIG. 2 depicts a series of method steps of one embodiment of the method of provisioning generally shown in FIG. 1.

A method 200 as seen in FIG. 2 depicts a flowchart having a series of steps for one preferred embodiment of improved provisioning of wireless client devices. For the purposes of this embodiment, the qualifiers "Initial", "Current" and "Latest" describe various versions of the configuration file being used in the client device. The "Initial" configuration file is unique and factory programmed into the device. Preferably, it contains only the minimum required settings to retrieve additional configuration file(s) containing all configuration settings and it is not modified or deleted. The "Current" configuration file contains all configuration settings including updates of those setting found in the "Initial" configuration file. It is replaced whenever a new configuration file is downloaded. When the "Latest" configuration file is downloaded, all settings in the "Current" configuration file that are not replaced must be preserved and any new settings must be added. In one embodiment of the invention, the minimum parameters that are factory programmed are selected from the group consisting of network-specific information (VoIP service provider's provisioning server FQDN and DNS server address) and device-specific information (key used to decrypt configuration files, password for device management and hash directory location of the configuration file on the server).

In detail, the method 200 starts at step 202 with the triggering of a configuration profile updating event. Such event is selected from the group consisting of the device powering up (step 202a), the expiration of an internal device timer (step 202b) and the device receiving a message regarding the availability of a new configuration profile for immediate downloading (step 202c). Once the updating event has been triggered, the method proceeds to step 204 where a check of the status of the configuration file in the device is performed. A "Current" or most recently updated configuration file 226 is either previously available in the device memory or otherwise provided/recalled to the device to define the "Current" file to be checked in step 204.

At step 206, an evaluation of the "Current" file is performed. In one embodiment of the invention, the evaluation determines if the "Current" configuration file exists (i.e., in the memory of the device) and is valid (i.e., complete and otherwise uncompromised by unauthorized changes). If the evaluation is positive (i.e., the file is valid), the method proceeds to step 222 where a scenario of a subsequent use of the file (and the device) is established. In this subsequent use scenario, a determination of whether the "Current" configuration file 226 is the most recent version of such file occurs. The determination is made by first making an attempt to obtain a "Latest" configuration file (i.e., from a configuration file server of the VoIP Provider) in step 224 and evaluating a "File Not Found" condition at step 230 based on such attempt. If the evaluation is positive (i.e., no "Latest" configuration file was found), then there is no updated configuration file available and such condition is established at step 236. Such condition is acceptable and the method 200 continues by using the "Current" configuration file 226 and its settings at step 238. Continuing the method in this manner further involves step 240 wherein a check for new firmware is performed.

If the evaluation of the "File Not Found" condition is negative (i.e., there is a "Latest" configuration file), then an updating of the configuration file must occur. The updating process is performed by downloading the "Latest" configuration file at step 232 and performing a decrypting operation of same at step 234. At step 214, a query is performed to determine if the decryption was successful or not. If the decryption was not successful, the method 200 returns to step 206 to re-determine the configuration file existence and validity. If the decryption was successful, the method 200 proceeds to step 216 where a "Save" operation is performed. Such operation overwrites the existing "Current" configuration file 226 on the device with the "Latest" configuration. After the configuration file is saved, the settings of this updated configuration file are applied to the current session in step 218. At step 220, a scenario of confirming the new "Current" configuration file settings, particularly the hash directory location of the configuration file on the server, is established. This simply involves returning to step 224 to again attempt to obtain a "Latest" configuration file. Doing so provides method of effectively confirming the new settings. Note that looping in this manner will most likely result in a positive File Not Found evaluation (assuming that the configuration file has not been updated within the time that elapsed during the aforementioned downloading and decrypting of the "Latest" file described above) so that the method eventually moves out of the loop and down the branch of steps starting with step 236 as discussed earlier.

Returning to step 206, if the evaluation is negative (i.e., the file does not exist or is not valid), the method proceeds to step 208 where a scenario of a first time use of the file (and the device) is established. In this first use scenario, there is no "Current" configuration file loaded into the device; therefore, it is necessary to obtain such a file using the minimal "Initial" configuration file parameters that are factory programmed in the device. This first time retrieval of the configuration file will always use the initial hash directory and decrypt key to first download (at step 210) and then extract (at step 212) the configuration information. After the decryption operation is performed, the method 200 proceeds to step 214 where a query is performed to determine if the decryption was successful or not. The results of the query have been previously described above as this is the same operation and part of the earlier described sequence of operations when downloading a "Latest" configuration file is performed from a different part of the method 200.

Figure 3:
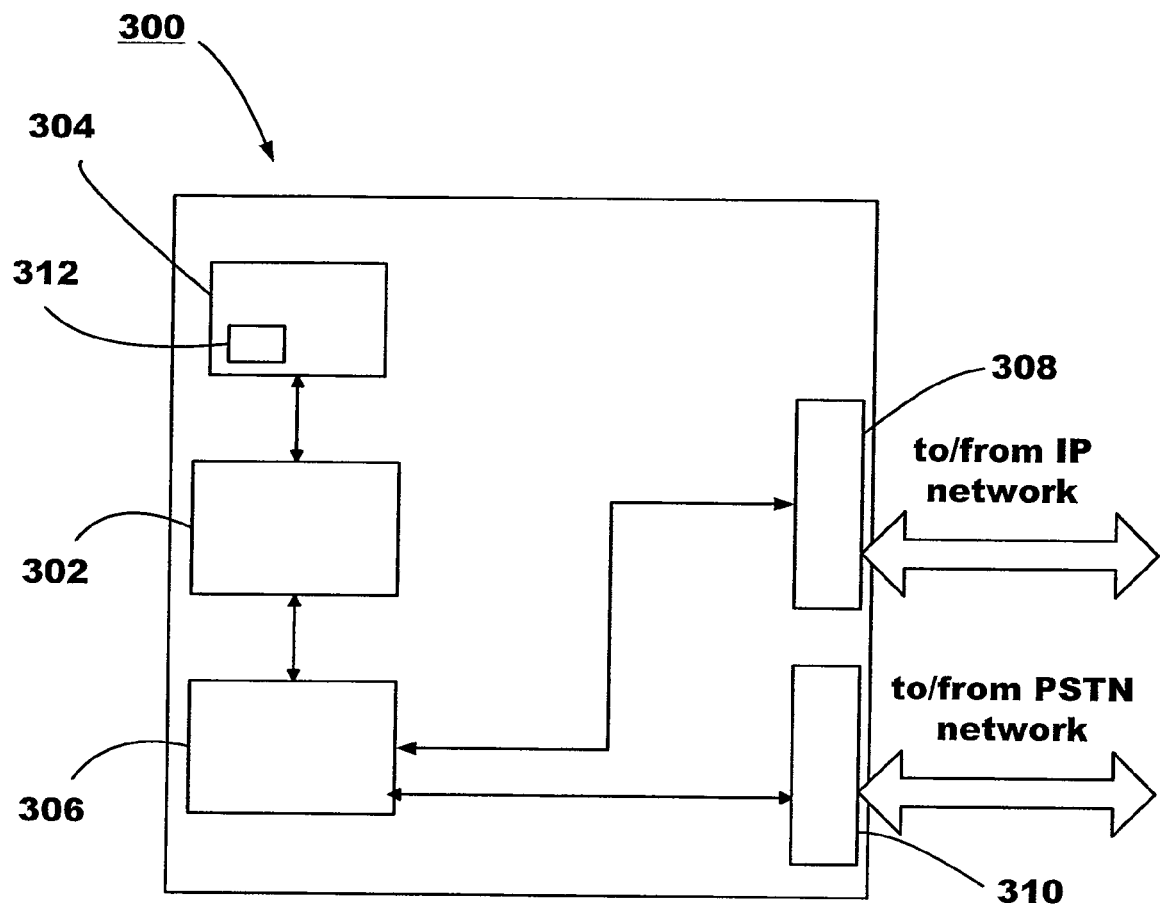
FIG. 3 depicts a schematic diagram of a controller that may be used to practice one or more embodiments of the present invention.

FIG. 3 depicts a schematic diagram of a controller 300 that may be used to practice the present invention. The controller 300 may be used to facilitate control of the configuration file update signaling method and system component interaction as described above. The controller 300 may be one of any form of a general purpose computer processor used in accessing an IP-based network such as a corporate intranet, the Internet or the like. The controller 300 comprises a central processing unit (CPU) 302, a memory 304, and support circuits 306 for the CPU 302. The controller 300 also includes provisions 308/310 for connecting the controller 300 to an IP-based network (as part of the VoIP service provider equipment 408) and the PSTN equipment 416 to facilitate execution of the signaling process. The memory 304 is coupled to the CPU 302. The memory 304, or computer-readable medium, may be one or more of readily available memory such as random access memory (RAM), read only memory (ROM), floppy disk, hard disk, flash memory or any other form of digital storage, local or remote. The support circuits 306 are coupled to the CPU 302 for supporting the processor in a conventional manner. These circuits include cache, power supplies, clock circuits, input/output circuitry and subsystems, and the like. A software routine 312, when executed by the CPU 302, causes the controller 300 to perform signaling operations in accordance with the present invention and is generally stored in the memory 304. The software routine 312 may also be stored and/or executed by a second CPU (not shown) that is remotely located from the hardware being controlled by the CPU 302.

The software routine 312 is executed when the aforesaid provisioning method is desired (i.e., when a PUSH operation needs to be performed and an analysis of which environment the wireless client device is operating needs to be conducted). The software routine 312, when executed by the CPU 302, transforms the general purpose computer into a specific purpose computer (controller) 300 that controls the process. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 312 of the present invention is capable of being executed on computer operating systems including but not limited to Microsoft Windows 98, Microsoft Windows XP, Apple OS X and Linux. Similarly, the software routine 312 of the present invention is capable of being performed using CPU architectures including but not limited to Apple Power PC, Intel x86, Sun SPARC and ARM products.

While foregoing is directed to embodiments of the present invention, other and further embodiments of the invention may be devised without departing from the basic scope thereof, and the scope thereof.

What is claimed is:

1. A method for provisioning a wireless multi-modal client device in a telecommunications system comprising:
    determining a provisioning environment within and a provisioning condition under which the client device is operating;
    determining a state of a configuration file of the client device; and
    obtaining an updated configuration file based on the provisioning environment and provisioning conditions,
    wherein the provisioning environment is determined by detecting one or more wireless networks accessible by the client device, and
    wherein each of the wireless networks defining a given provisioning environment has a characteristic timing interval for configuration file updating.

2. The method of claim 1 wherein the provisioning environment is selected from a group of wireless networks consisting of an IP-based network and a PSTN-based network.

3. The method of claim 2 wherein a connection to the IP-based network is made via WiFi.

4. The method of claim 2 wherein a connection to the PSTN-based network is made via GSM/GPRS.

5. The method of claim 2 wherein when the client device is powered up, the updated configuration file is retrieved via the IP-based network as a first preference and the PSTN-based network as a second preference.

6. The method of claim 1 wherein an IP-based network environment has a resynchronization timing interval.

7. The method of claim 6 wherein the resynchronization timing interval is in the range of approximately 1-86400 seconds.

8. The method of claim 1 wherein a PSTN-based network environment has an expiration timing interval.

9. The method of claim 8 wherein the expiration timing interval is in the range of approximately 1-30 days.

10. The method of claim 1 wherein an incremental timer determines an elapsed time for each characteristic timing interval.

11. The method of claim 10 wherein the incremental timer switches between characteristic timing intervals depending upon the provisioning environment that the client device is operating within.

12. The method of claim 1 wherein each of the wireless networks defining a given provisioning environment has a characteristic notification message for requesting an updated configuration file.

13. The method of claim 12 wherein the IP-based network notification message is a SIP-based message.

14. The method of claim 13 wherein the SIP-based message is a NOTIFY message.

15. The method of claim 12 wherein the PSTN-based network notification message is a Short Messaging Service (SMS).

16. The method of claim 1 wherein determining the state of the configuration file further comprises determining whether the configuration file exists and is valid in the client device.

17. The method of claim 1 wherein determining the state of the configuration file further comprises determining whether the configuration file is the latest configuration file available in the telecommunications system.

18. The method of claim 1 wherein obtaining an updated configuration file further comprises accessing the provisioning environment as a result of an operation selected from the group consisting of a push and a pull.

* * * * *